(12) United States Patent
Desai et al.

(10) Patent No.: US 12,254,625 B2
(45) Date of Patent: Mar. 18, 2025

(54) NEURAL NETWORK ARCHITECTURE FOR MOVEMENT ANALYSIS

(71) Applicant: AIC Innovations Group, Inc., New York, NY (US)

(72) Inventors: Deshana Desai, Jersey City, NJ (US); Xiaoguang Lu, West Windsor, NJ (US); Lei Guan, Jersey City, NJ (US); Shaolei Feng, West Wndsor, NJ (US); Richard Christie, Pennington, NJ (US)

(73) Assignee: AIC Innovations Group, Inc., New York, NY (US)

( * ) Notice: Subject to any disclaimer, the term of this patent is extended or adjusted under 35 U.S.C. 154(b) by 306 days.

(21) Appl. No.: 17/664,590

(22) Filed: May 23, 2022

(65) Prior Publication Data
US 2023/0410290 A1    Dec. 21, 2023

(51) Int. Cl.
*G06T 7/00* (2017.01)
*G06F 40/279* (2020.01)
(Continued)

(52) U.S. Cl.
CPC .......... *G06T 7/0012* (2013.01); *G06F 40/279* (2020.01); *G06N 3/044* (2023.01);
(Continued)

(58) Field of Classification Search
CPC .................. G06T 7/0012; G06T 7/246; G06T 2207/10016; G06T 2207/20081;
(Continued)

(56) References Cited

U.S. PATENT DOCUMENTS

2018/0289308 A1    10/2018  Lever et al.
2019/0110754 A1*   4/2019   Rao .......................... G06N 7/00
(Continued)

FOREIGN PATENT DOCUMENTS

CN    111210415    5/2020
EP    3640951      4/2020

OTHER PUBLICATIONS

International Search Report and Written Opinion in International Appln. No. PCT/US2023/023092, mailed Aug. 21, 2023, 14 pages.
(Continued)

*Primary Examiner* — Huy C Ho
(74) *Attorney, Agent, or Firm* — Fish & Richardson P.C.

(57) ABSTRACT

A video is segmented into a plurality of sequences corresponding to different facial states performed by a patient in the video. For each sequence, displacement of a plurality of groups of landmarks of a face of the patient is tracked, to obtain, for each group of the plurality of groups, one or more displacement measures characterizing positions of the landmarks of the group. The one or more displacement measures corresponding to each group are provided into a corresponding neural network, to obtain a landmark feature. The neural networks corresponding to each group are different from one another. A sequence score for the sequence is determined based on a plurality of landmark features corresponding to the groups. A plurality of sequence scores are provided into a machine learning component, to obtain a patient score. A disease state of the patient is determined based on the patient score.

21 Claims, 15 Drawing Sheets

(51) Int. Cl.
*G06N 3/044* (2023.01)
*G06N 3/045* (2023.01)
*G06T 7/246* (2017.01)
*G06V 10/82* (2022.01)
*G06V 40/16* (2022.01)

(52) U.S. Cl.
CPC .............. *G06N 3/045* (2023.01); *G06T 7/246* (2017.01); *G06V 10/82* (2022.01); *G06V 40/171* (2022.01); *G06T 2207/10016* (2013.01); *G06T 2207/20081* (2013.01); *G06T 2207/20084* (2013.01); *G06T 2207/30004* (2013.01); *G06T 2207/30201* (2013.01)

(58) Field of Classification Search
CPC . G06T 2207/20084; G06T 2207/30004; G06T 2207/30201; G06F 40/279; G06N 3/044; G06N 3/045; G06V 10/82; G06V 40/171; G06V 40/174
USPC ......................................................... 382/115
See application file for complete search history.

(56) References Cited

U.S. PATENT DOCUMENTS

2020/0251190 A1   8/2020  Glasner et al.
2020/0364868 A1  11/2020  Zhang et al.
2021/0202090 A1*  7/2021  O'Donovan ........... G16H 40/67
2021/0337307 A1* 10/2021  Wexler ................. G06V 40/161

OTHER PUBLICATIONS

Liu et al., "Region Based Parallel Hierarchy Convolutional Neural Network for Automatic Facial Nerve Paralysis Evaluation," IEEE Transactions on Neural Systems and Rehabilitation Engineering, Oct. 2020, 28(10):2325-2332.

Yan et al., "Multi-cue Fusion for Emotion Recognition in the Wild," Neurocomputing, May 2018, 309:27-35.

* cited by examiner

NEURAL NETWORK ARCHITECTURE FOR MOVEMENT ANALYSIS

TECHNICAL FIELD

This disclosure relates generally to machine learning-based analysis of facial and other movements.

BACKGROUND

Various medical conditions, such as tardive dyskinesia and Parkinson's disease, can be diagnosed by analysis of facial movements. During an examination procedure, a patient is asked to perform various actions, and movements of different portions of the patient's face and/or body are rated using a scale such as the Abnormal Involuntary Movement Scale (AIMS). An overall score is used to determine a diagnosis for the patient.

SUMMARY

Some aspects of this disclosure describe a computer-implemented method in which a video is obtained. The video is segmented into a plurality of sequences corresponding to different facial states performed by a patient in the video. For each sequence, displacement of a plurality of groups of landmarks of a face of the patient is tracked, to obtain, for each group of the plurality of groups, one or more displacement measures characterizing positions of the landmarks of the group. For each group of the plurality of groups, the one or more displacement measures corresponding to the group are provided into a corresponding neural network, to obtain a landmark feature corresponding to the group. The neural networks corresponding to each group of the plurality of groups are different from one another. A sequence score for the sequence is determined based on a plurality of landmark features corresponding to the plurality of groups. A plurality of sequence scores corresponding to the plurality of sequences are provided into a machine learning component, to obtain a patient score. A disease state of the patient is identified based on the patient score.

Implementations of this and other described methods can have some or all of at least the following characteristics.

In some implementations, the plurality of groups of landmarks correspond to different portions of the face of the patient.

In some implementations, the different facial states include one or more of a mouth state, a tongue state, or a jaw state.

In some implementations, the neural networks corresponding to each group of the plurality of groups are different from one another in at least one of weights or hyperparameters.

In some implementations, the method includes segmenting the video into the plurality of sequences, wherein segmenting the video includes obtaining an audio track corresponding to the video; determining a text transcript of the audio track; using a natural language processing neural network, identifying portions of the text transcript that correspond to the different facial states performed by the patient; and based on a correspondence between the identified portions of the text transcript and portions of the video, segmenting the video into the plurality of sequences such that each sequence of the plurality of sequences portrays a corresponding facial state indicated by the text transcript.

In some implementations, the neural networks corresponding to each group of the plurality of groups include bidirectional gated recurrent neural networks.

In some implementations, a first plurality of groups of landmarks tracked in a first sequence of the plurality of sequences is at least partially different from a second plurality of groups of landmarks tracked in a second sequence of the plurality of sequences.

In some implementations, for each sequence, determining the sequence score for the sequence includes combining the plurality of landmark features using an additional machine learning component, to obtain the sequence score for the sequence.

In some implementations, the additional machine learning component includes a long short-term memory neural network.

In some implementations, providing the plurality of sequence scores into the machine learning component includes providing the plurality of sequence scores into an activation function, to obtain an activation function output; and determining the patient score based on the activation function output.

In some implementations, providing the plurality of sequence scores corresponding to the plurality of sequences into the machine learning component to obtain the patient score includes determining, as a first sequence, a sequence of the video in which a tongue of the patient is displayed; determining optical flows characterizing facial movement in the first sequence; applying a trained tongue identification neural network to determine, for a plurality of frames of the video, a tongue region of interest; determining a tongue displacement measure based on portions of the optical flows corresponding to the tongue region of interest; and determining the patient score based on the tongue displacement measure.

In some implementations, providing the plurality of sequence scores corresponding to the plurality of sequences into the machine learning component to obtain the patient score includes obtaining an audio track from the video; determined, based on one or more verbal biomarkers in the audio track, an audio score; and providing the audio score into the machine learning component to obtain the patient score based on the plurality of sequence scores and based on the audio score.

In some implementations, the disease state is associated with at least one of Parkinson's disease, akathisia, akinesia, athetosis, ataxia, ballismus, bradykinesia, cerebral palsy, chorea, dystonia, geniospasm, myoclonus, spasms, a stereotypic movement disorder, stereotypy, tardive dyskinesia, or a tic disorder.

Some aspects of this disclosure describe another method. In the method, training data including training movement data is obtained, the training movement data characterizing movements of a patient during performance of multiple different facial states. A machine learning architecture is trained using the training data. The machine learning architecture includes, for each different facial state of the multiple different facial states, a plurality of different neural networks corresponding to different groups of facial landmarks, the plurality of different neural networks configured to determine landmark features based on movement of the different groups of facial landmarks. The machine learning architecture is configured to, for each different facial state, determine a sequence score corresponding to the facial state based on the landmark features output by the plurality of different neural networks corresponding to the facial state. The machine learning architecture includes a machine learning component configured to determine a patient score based on sequence scores corresponding to the multiple different facial states. Training the machine learning architecture includes training the machine learning component and training, for each different facial state, the plurality of different neural networks corresponding to the facial state based on the training movement data.

Implementations of this and other described methods can have some or all of at least the following characteristics.

In some implementations, the machine learning architecture includes, for each different facial state of the multiple different facial states, an additional machine learning component that is configured to determine the sequence score corresponding to the facial state based on the landmark features output by the plurality of different neural networks corresponding to the facial state.

In some implementations, for each different facial state of the multiple different facial states, the additional machine learning component includes a long short-term memory neural network.

In some implementations, the training movement data includes, for each different facial state of the multiple different facial states, a corresponding training sequence score. The corresponding training sequence score characterizes movement of the patient during performance of the facial state.

In some implementations, training the machine learning architecture includes iteratively reducing a value of at least one loss function, and the value of the at least one loss function is based on differences between the training sequence scores of the training data and sequence scores determined by the machine learning architecture.

In some implementations, the training data includes a training patient score, and wherein training the machine learning architecture includes iteratively reducing a value of at least one loss function, the value of the at least one loss function based on a difference between the training patient score and a patient score determined by the machine learning architecture.

In some implementations, the plurality of different groups of facial landmarks correspond to different portions of the face of the patient.

In some implementations, the multiple different facial states include one or more of a mouth state, a tongue state, or a jaw state.

In some implementations, the plurality of different neural networks configured to determine landmark features include bidirectional gated recurrent neural networks.

In some implementations, the machine learning component includes: an activation function configured to determine an activation function output based on the sequence scores corresponding to the multiple different facial states, and a fully connected layer configured to determine a fully connected layer output based on the activation function output. The patient score is based on the fully connected layer output.

Some aspects of this disclosure describe another method. In the method, a video is obtained showing movements of a patient. A plurality of landmarks of the face of the patient are identified in the video. Based on a proper subset of the plurality of landmarks, a moving local coordinate system is determined in which displacements caused by rigid movements of a head and body of the patient are reduced compared to in a fixed coordinate system. Displacement measures characterizing movement of other landmarks of the plurality of landmarks in the moving local coordinate system are determined. The displacement measures are provided into a trained neural network. Based on an output of the trained neural network, a patient score indicating a disease state of the patient is obtained.

Implementations of this and other described methods can have some or all of at least the following characteristics.

In some implementations, the moving local coordinate system is determined such that a first landmark of the proper subset of the plurality of landmarks is fixed in the moving local coordinate system.

In some implementations, determining the displacement measures includes: determining positions of the proper subset of the plurality of landmarks in the fixed coordinate system; determining a transform of the fixed coordinate system that causes the first landmark to be fixed after the transform; applying the transform to positions of other landmarks of the plurality of landmarks, to obtain transformed positions of the other landmarks; and determining the displacement measures based on the transformed positions.

In some implementations, the first landmark includes a nose feature of the face.

In some implementations, the nose feature includes a nose tip.

The implementations described herein can provide various benefits. For instance, in some implementations, the use of different neural network models to analyze different groups of facial landmarks can provide improved landmark feature determination, leading to improved disease state determination. In some implementations, separate analysis of different portions of patient video using different machine learning components can provide improved sequence score determination, leading to improved disease state determination. In some implementations, the separate analysis of different portions of patient video can be combined to give a single more reliable estimate based on the separate portions. In some implementations, landmarks are transformed into a moving local coordinate system, which can reduce irrelevant contributions to displacement data and emphasize muscle movements that are indicative of disease states. In some implementations, tongue regions of interest can be identified for inclusion of tongue displacement data in disease state determination. In some implementations, especially in the regions where no well-defined landmarks are available (e.g., the tongue), optical flow is estimated with neural networks to represent regional displacement.

These and other methods described in this disclosure may be implemented at least as methods, systems, devices, and non-transitory, computer-readable storage media. The details of the disclosed implementations are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Figure 1A:
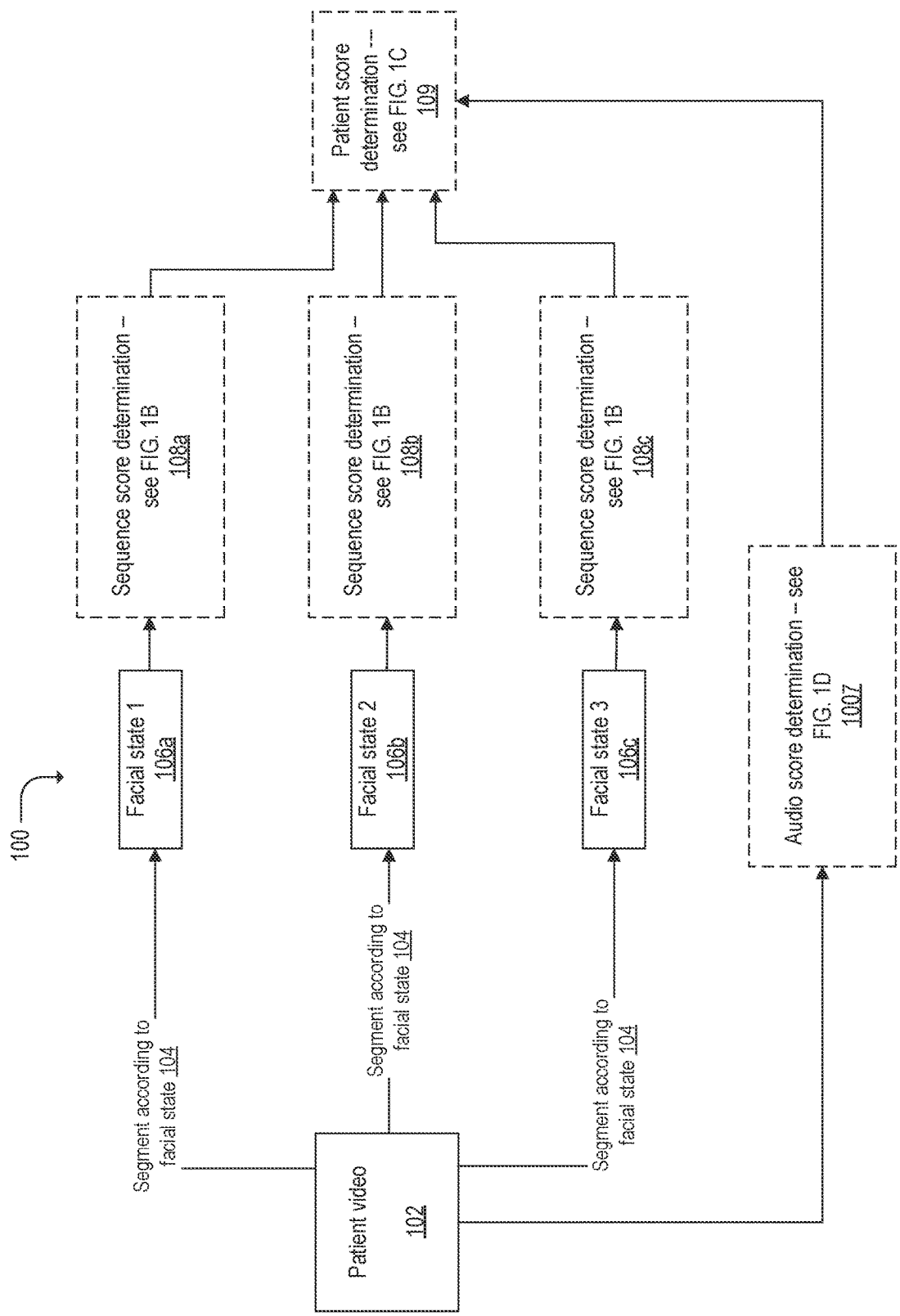
FIGS. 1A-1D are diagrams illustrating an example of a video analysis process according to some implementations of this disclosure.

Patient movements can be analyzed to diagnose diseases and determine disease severity. For example, facial movements such as grimacing and tongue exposure can be indicative of tardive dyskinesia. Although movement analysis has traditionally been performed by medical professionals based on in-person or remote sessions, automated, computer-performed movement analysis can provide more consistent analyses that are less susceptible to human-induced analyst-to-analyst and session-to-session variation. Artificial intelligence techniques, such as neural networks and other machine learning approaches, can be used to analyze videos showing patient movement and determine movement-based metrics. However, existing machine learning architectures for movement analysis can output inaccurate and unreliable results that can lead to incorrect patient diagnoses.

For example, the entire analysis task, from an input video sequence to a determination of disease severity, may be too complex for a single neural network to handle, especially when training data is limited. Implementations according to this disclosure split the analysis among multiple specialized neural networks that perform sub-tasks of the overall analysis, such as feature extraction, landmark detection, tongue segmentation, and time-series modeling. This can improve the accuracy and reliability of disease state determination. Besides the advantages gained generally from dividing the analysis among multiple neural networks, the architectures described in this disclosure divide the analysis in an advantageous manner that is particularly well-suited to the disease state determination process. In some implementations, the architectures described in this disclosure can provide improved accuracy and reliability compared to alternative architectures that include multiple neural networks that are different from and/or are arranged differently from the architectures described herein.

FIGS. 1A-1D show an example of a process for analysis of movements in recorded patient video. Although the process 100 is directed to facial movement analysis, other implementations can instead or additionally include analysis of other movement types, such as body movements. The process 100 is associated with a machine learning architecture that includes the various different neural networks and machine learning components described in reference to FIGS. 1A-1D.

In the process 100, a patient video 102 is obtained that depicts a session during which a patient performs multiple states. For example, the states can include facial states such as a still face (e.g., a neutral expression), an open mouth state (the patient opens their mouth), a tongue out state (the patient exposes their tongue out of an open mouth or a closed mouth), a facial and oral movements state (the patient performs instructed or self-directed changes in expression, mouth state, and/or tongue state), and/or other states. For implementations that include non-facial states, the states can instead or additionally include body states such as sitting with hands on knees and/or sitting with hands unsupported.

In some implementations, the patient video 102 is a recording of an in-person or remote session with the patient performed by a medical professional. For example, the medical professional can lead the patient through a sequence of steps, providing instructions as to the states that should be performed by the patient. In some implementations, the patient video 102 is a recording of an automated session with the patient, e.g., performed by an application on the patient's user device. The application can provide visual and/or audio instructions to the patient to lead the patient through the session, for example, using animations to show desired states to be performed, and the session is recorded by a camera of the user device. In some implementations, the session can be performed in conjunction with a dosing verification aspect of the application. For example, before or after the patient takes a pill or other medication in view of the camera of the user device for verification, the application asks the patient to perform one or more states of the session. In some implementations, the patient video 102 is a live or near-live video captured for real-time or near-real-time analysis. For example, the patient video 102 can be streamed from a capturing device to a remote server for analysis.

The patient video 102 is segmented according to facial state (104). In implementations in which the patient video 102 was provided through an automated session, the different facial states may be already labeled in the patient video 102, e.g., in metadata associated with the patient video 102. For example, as the application provides instructions corresponding to different facial states, the application saves timestamps of the instructions in the metadata. Intervals of the patient video 102 before, between, and after different timestamps correspond to different facial states, and the patient video 102 accordingly is segmented based on the timestamps.

Figure 3:
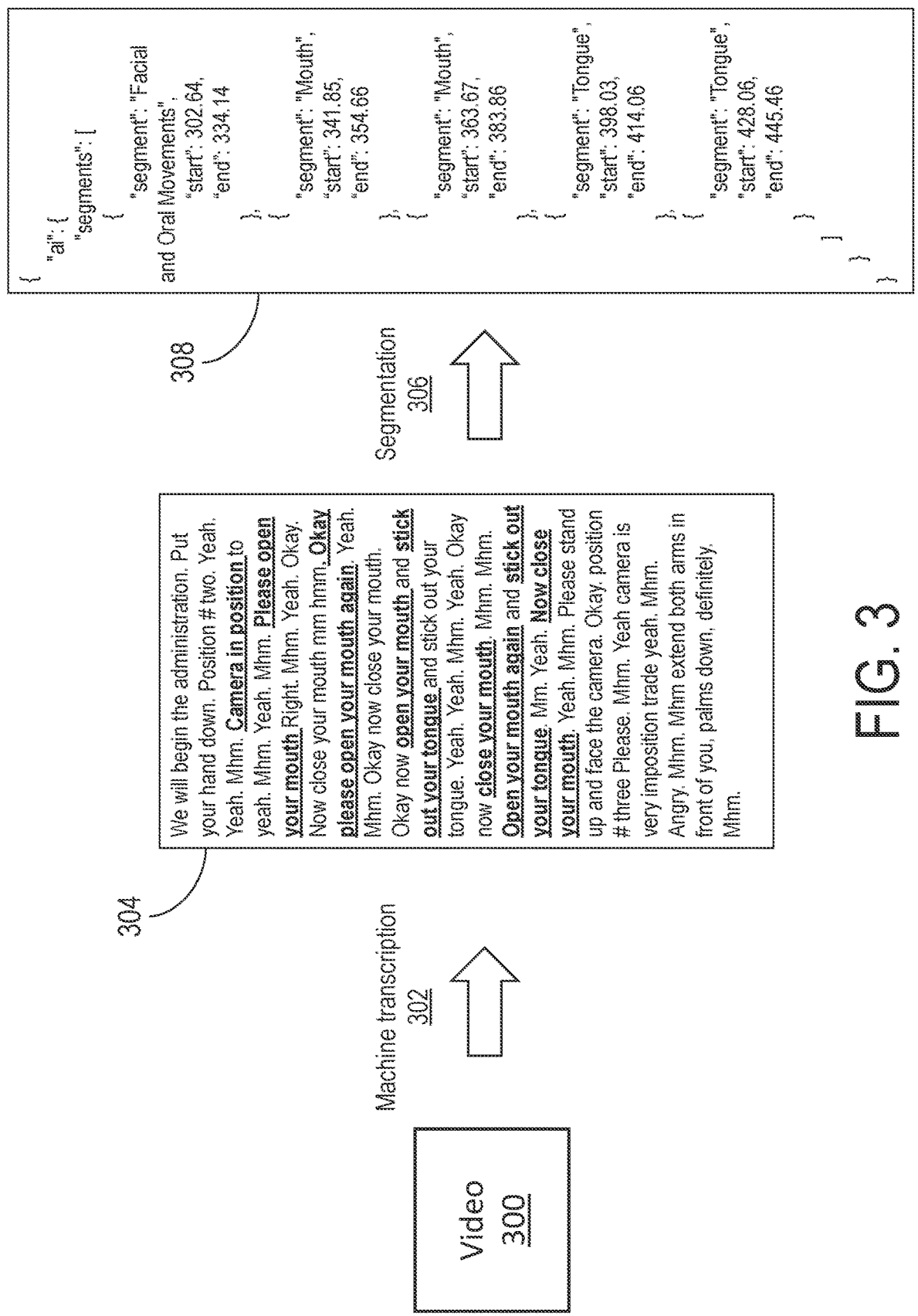
FIG. 3 is a diagram illustrating an example of an audio-based video segmentation process according to some implementations of this disclosure.

In some implementations, automated speech analysis (in some implementations, in conjunction with other methods) based on audio of the video is used to segment the patient video 102. For example, as shown in FIG. 3, a text transcript 304 is extracted from a video 300 through machine transcription (302). One or more speech-to-text/speech recognition methods known in the art can be used to extract the text transcript 304, such as a machine learning-based approach including a hidden Markov model and/or a neural network. The text transcript 304 is linked to corresponding times at which words in the text transcript 304 were spoken. Based on the text transcript 304, speech analysis is performed to segment the video data (306). For example, a keyword search can be performed to identify keywords such as "tongue," "open," and "close." These keywords correspond to one or more facial states, and the times at which the keywords are spoken are used to segment the video 300. In some implementations, a natural language processing neural network is used to identify more complex concepts in the text transcript 304, such as instructions that would be expected to precede a given facial state (e.g., "open your mouth and stick out your tongue" and "close your mouth"). The natural language processing can include semantic analysis, intent determination, and other natural language processing tasks. Any suitable natural language processing neural network can be used, such as a convolutional neural network, a recurrent neural network, or another neural network type.

Based on the times an instruction is given as determined by the natural language processing, the video 300 is segmented at corresponding times that are expected to correspond to the facial state indicated by the instruction. As shown in FIG. 3, a segmentation 308 of the video 300 indicates a series of sequences, each sequence corresponding to a particular facial state (e.g., "facial and oral movements" and "[open] mouth") and timestamps during which the facial state is expected to be performed.

In some implementations, instead of or in addition to audio (speech) analysis, a video is segmented based on visual analysis. One or more computer vision methods (e.g., one or more trained image analysis neural networks and/or other algorithm types) can be used to analyze video (e.g., frames of the video) to determine which states are being performed in which portions of the video. Various methods can be used, singly or in conjunction with one another. In "zoom-in detection," the video being zoomed-in on, or otherwise adjusted to highlight (e.g., by changing a field of view), a particular portion of the body indicates that the patient is performing a state corresponding to the portion of the body. For example, zooming in on the mouth can indicate that the patient is performing an open mouth or tongue state. In "activity detection," computer vision methods are used to determine the state being performed by the patient, e.g., by determining whether the patient's mouth is open or closed, whether the patient's tongue is extended or not, etc. Machine learning models (e.g., neural network models) trained on labeled video of patients performing these states can be applied to perform this task. Other methods are also within the scope of this disclosure.

Figure 4:
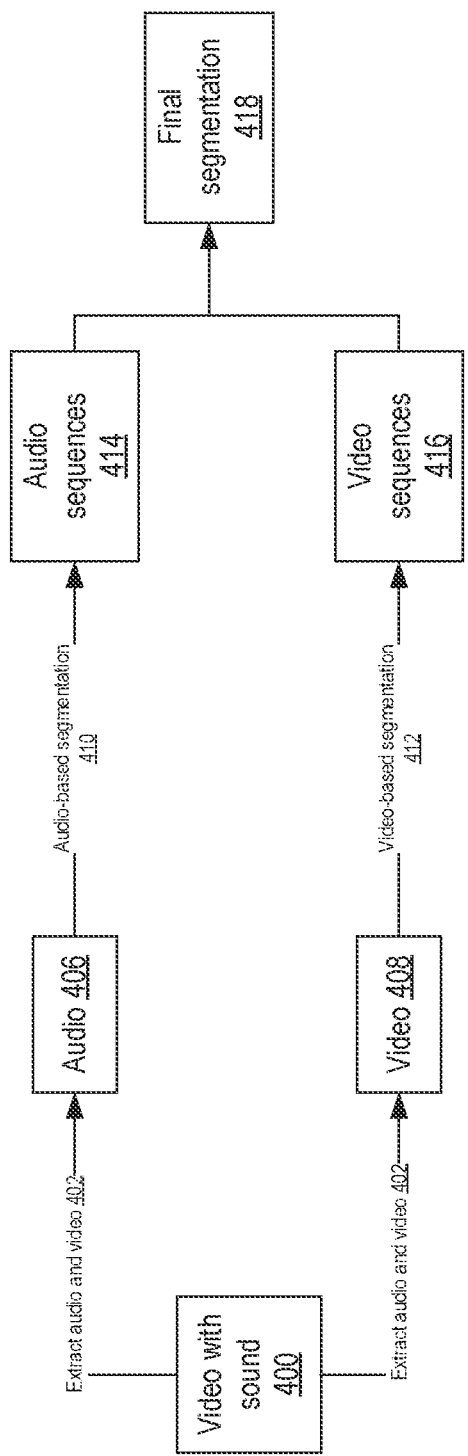
FIG. 4 is a diagram illustrating an example of a joint audio- and video-based video segmentation process according to some implementations of this disclosure.

In some implementations, both audio-based and video (image)-based analyses are performed. As shown in FIG. 4, a video with sound 400 is processed to extract audio 406 and video 408 (402). Audio-based segmentation 410 and video-based segmentation 412 are performed to obtain audio sequences 414 and video sequences 416, the timings of which may not align. For example, audio analysis may indicate that a tongue out segment has timing 1:13-1:33, while video analysis may indicate that the same segment has timing 1:15-1:30. The two sets of sequences 414 and 416 are reconciled to obtain a final segmentation 418. For example, in some implementations the audio-based segmentation 410 and the vision-based segmentation 412 are each associated with a confidence, and the segmentations 410, 412 are reconciled in a weighted combination based on the confidences (e.g., a weighted average) to obtain a final segmentation 418.

Referring back to FIG. 1A, as a result of audio, video, or audio-visual segmentation, separate video portions 106a, 106b, 106c are obtained corresponding to different facial states. Each video portion can be referred to as a "sequence" because the video portion includes multiple frames in a sequence and provides information on a sequence of facial movements/positions performed by the patient.

Figure 1B:
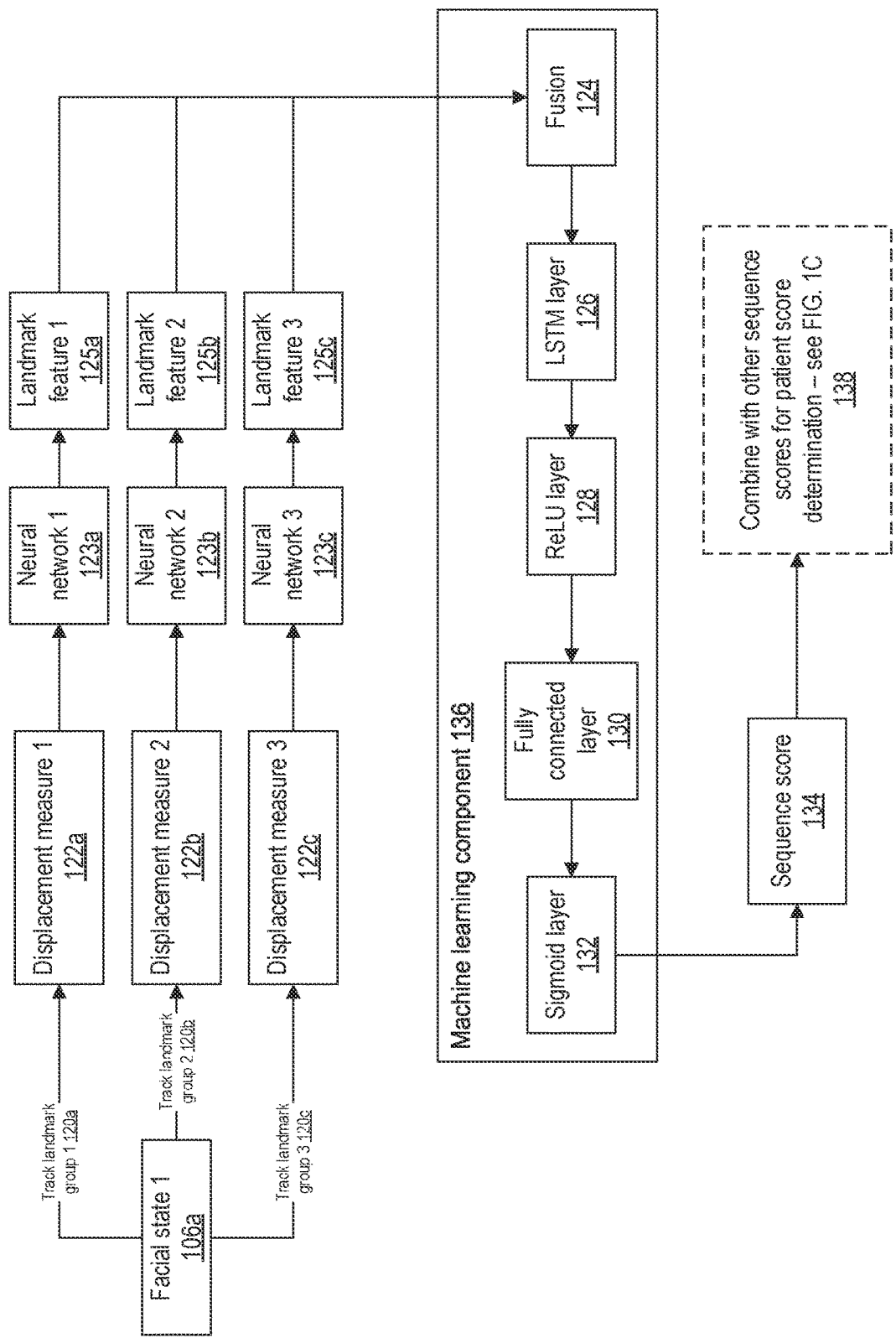
Figure 5:
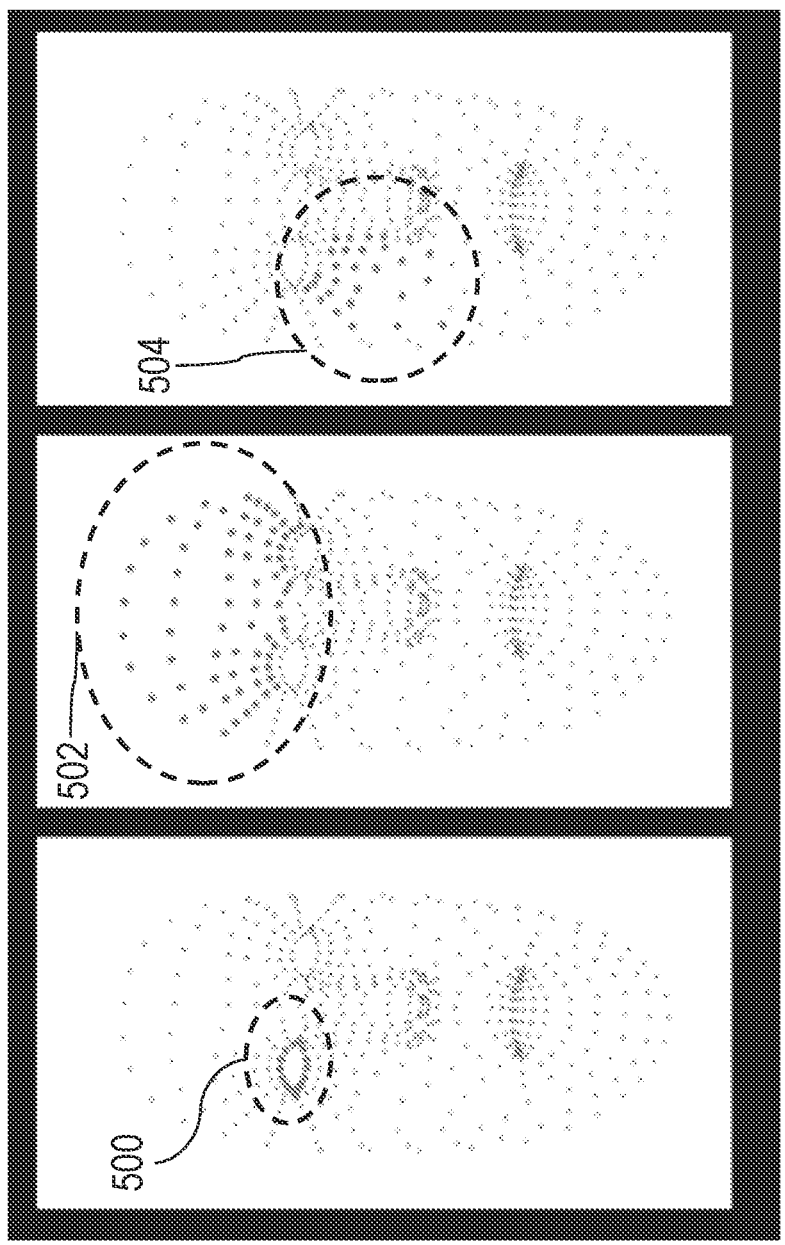
FIG. 5 is a diagram illustrating examples of groups of facial landmarks.

For each sequence 106a, 106b, and 106c corresponding to each facial state, a corresponding sequence score is determined (108a, 108b, 108c). As shown in FIG. 1B in reference to facial state 1 (sequence 106a), multiple groups of landmarks on a face of the patient are tracked through multiple frames of the sequence (120a, 120b, 120c). For facial analysis, each landmark is a point, location, or region on the patient's face that moves as the patient's face moves, and landmarks can be grouped into groups corresponding to different portions of the face and/or to different muscle groups. For example, as shown in FIG. 5, a first group 500 is a "right eye" group, a second group 502 is a "forehead" group, and a third group 504 is a "right cheek" group. Other, non-limiting examples of landmark groups are: left eye, left cheek, nose, upper left jaw, upper right jaw, lips, lower left jaw, lower right jaw, chin, between check and jaw (left), between cheek and jaw (right). Other examples of landmark groups that can be analyzed include "lips and perioral," "jaw," and "tongue." For non-facial analysis, landmarks can be points, locations, or regions on other portions of the patient's body, e.g., corresponding to particular joints, muscles, and skeletal features, with groups including "upper" (points/locations of the arms, wrists, hands, and fingers) and "lower" (points/locations of the legs, knees, ankles, and toes).

In some implementations, only a proper subset of the groups (e.g., not all of the groups) are tracked for each facial state. For example, for some facial states (e.g., still face), the groups left eye, right eye, upper left jaw, upper right jaw, forehead, left cheek, and right cheek can be tracked, while for other facial states (e.g., tongue out) the groups lips, nose, between cheek and jaw (left), between cheek and jaw (right), lower left jaw, and lower right jaw can be tracked. In some implementations, for a facial state, the tracked groups are lips, nose, between cheek and jaw (left), and between cheek and jaw (right). Limiting the analyzed landmarks can reduce input complexity to provide faster and/or higher-quality learning by the neural networks and reduce processing burdens on the neural networks. For example, in some implementations, for each facial state, seven or fewer groups of landmarks are tracked.

For each landmark group for each sequence, time-dependent positions of the landmarks are tracked to obtain a displacement measure (e.g., displacement measures 122a, 122b, and 122c) for the landmark group that characterizes time-dependent movements/positions of the landmarks of the group. For example, for each analyzed frame of the sequence, a position of each landmark is determined in a fixed coordinate system or in a local coordinate system (e.g., in a moving, face-normalized local coordinate system, as described in more detail below). Based on the positions, a time series characterizing movements/positions of the landmarks is determined. For example, a matrix can be determined, where rows of the matrix correspond to different landmarks, columns of the matrix correspond to different time-points (e.g., video frames), and values of the matrix indicate an amount of movement of the indicated landmark at the indicated time or an amount of displacement (e.g., from a neutral position) of the indicated landmark at the indicated time. The matrix is an example of a displacement measure. In some implementations, multiple displacement measures are determined for each group, where the multiple displacement measures separately characterize movement of distinct landmarks of the group, and the multiple displacement measures can be provided into the appropriate corresponding neural network for analysis of the group. In some implementations, optical flows can be generated and analyzed to determine the displacement measures, such as using an optical flow determination neural network as description in U.S. Patent Application Publication No. 2020/0364868, the entirety of which is incorporated herein by reference. Landmarks can be tracked using a known machine learning-based facial analysis engine (which may include one or more neural networks), such a face mesh-based tracking engine.

The displacement measures 122a, 122b, and 122c are provided as inputs into respective different neural networks 123a, 123b, and 123c. For example, a lower right jaw neural network receives, as input, a displacement measure characterizing movement of lower right jaw landmarks, and a nose neural network, different from the lower right jaw neural network, receives, as input, a displacement measure characterizing movement of nose landmarks. The neural networks 123a, 123b, and 123c are configured to provide, as output, respective landmark features 125a, 125b, 125c. The landmark features 125a, 125b, or 125c can be numbers, vectors, or other data types. For example, in some implementations, each landmark feature is a value (e.g., a number between 0 and 1) that scales positively with increasing displacement/movement of the landmarks of the landmark group corresponding to the neural network determining the landmark feature. In some implementations, instead of or in addition to indicating a degree of displacement/movement, the landmark features can indicate other parameters of the displacement/movement, such as a frequency of the movement, a variability of the movement, or another characteristic.

In some implementations, neural networks 123a, 123b, and 123c are not included. Rather, the displacement measures 122a, 122b, and 122c can be processed in a different way to obtain the landmark features 125a, 125b, 125c. For example, the displacement measures 122a, 122b, 122c can be time-averaged, normalized, and/or otherwise processed (e.g., by a Fourier analysis or to obtain a metric of dispersion of the displacement measures 122a, 122b, and 122c) to obtain the landmark features 125a, 125b, and 125c.

In some implementations, the different neural networks 123a, 123b, and 123c are different from each other in one or more of layer number, number of nodes per layer, activation function (e.g., sigmoid vs. tanh), or parameters such as weights and/or hyperparameters. Accordingly, based on these different characteristics (which can stem from the neural networks' different training), each neural network 123a, 123b, 123c is well-suited for analysis specifically of the landmark group corresponding to the neural network. In some implementations, this differentiation can provide improved landmark feature determination (e.g., determination that is more robust and/or accurate) compared to use of a single neural network for multiple different landmark groups. Each neural network can be trained based on training data showing or characterizing movement of the particular landmark group that the neural network is later used to analyze, improving overall inference accuracy.

In some implementations, the neural networks for landmark groups include Bidirectional Gated Recurrent Unit (Bidirectional GRU) layers, such that the neural networks are Bidirectional Recurrent Neural Networks (BRRNs). For example, the neural networks can include Bidirectional GRU layers without including Long Short-Term Memory (LSTM) layers. In some cases, the use of BRRNs can reduce overfitting, given the often limited training data available in the context of clinical diagnosis. However, the neural networks for landmark groups are not limited to BRRNs and can instead or additionally utilize other layer types such as LSTM layers and/or autoencoder layers. For example, recurrent neural network layers and LSTM layers can be architectured to better exploit the time-series nature of the displacement measures, and accordingly may, in some cases, provide more accurate results than other layer types given sufficient training data.

In some implementations, landmark groups can be analyzed for multiple facial states. For example, landmark group 1 (120a) can be tracked for both facial state 1 (106a) and facial state 2 (106b). In that case, the neural network used to analyze the displacement measures corresponding to the landmark group can be the same or different for different facial states.

The landmark features 125a, 125b, and 125c output by the different neural networks are processed using a machine learning component 136. In the example of the machine learning component 136 shown in FIG. 1B, the landmark features 125a, 125b, 125c are fused together (124). For example, the landmark features 125a, 125b, 125c separately output from the neural networks 123a, 123b, 123c can be combined (e.g., concatenated) into a vector representation. The unified landmark features are provided into one or more LSTM layers 126, the output of the last time point of which is provided into a Rectified Linear Unit (ReLU) activation layer 128. The LSTM layers 126 are configured to use feedback connections between cells/layers to process the landmark features 125a, 125b, and 125c to determine output data in accordance with the training of the LSTM layers 126. Other machine learning layer types/neural network layer types can be used in conjunction with or instead of the LSTM layers 126, in various implementations. Other activation layer types can be used in conjunction with or instead of the ReLU layer 128, such as sigmoid or tanh activation layers. The output of the ReLU layer 128 is provided into one or more fully connected layers 130 that compile data extracted by previous layers to determine an output the, and the output of the fully connected layers 130 is provided into a sigmoid layer 132 that determines an overall sequence score 134 for the portion of the video corresponding to facial state 1 (106a). The layers 126, 128, 130, and 132 constitute an additional neural network. The sequence score 134 (which can be a single value, such as a continuous value from 0 to 1) characterizes overall facial movement corresponding to the facial state.

In some implementations, the machine learning component 136 is configured to perform processing based on a movement type framework. For example, AIMS categorizes facial movements into "muscles of facial expression," "lips and perioral area," "jaw," and "tongue," while non-facial movements can be categorized into "upper" (arms, wrists, hands, and fingers) and "lower" (legs, knees, ankles, and toes). The landmark features 125a, 125b, 125c can already correspond to these movement types (e.g., when the corresponding landmark groups correspond to these movement types), and/or the machine learning component 136 can be configured to perform mappings from one or more of the landmark features 125a, 125b, 125c to features that characterize the movement types, and the sequence score 134 can, in some implementations, represent an aggregation of features/scores correspond to each movement type, such as a feature/score corresponding to "muscles of facial expression" and a feature/score corresponding to "lips and perioral area."

The neural networks 123a, 123b, and 123c and the layers of the machine learning component 136 (which have respective trainable parameters) can be trained in separate or unified training processes. In some implementations, the neural networks 123a, 123b, 123c are trained based on training data that includes (i) displacement measures characterizing movement of landmark groups (which may correspond to movement types) in videos and (ii) as labels of the displacement measures, human-determined values characterizing movement of the portions of the face corresponding to the landmark groups as portrayed in the videos. Training can include an iterative process in which weights and hyperparameters of the neural networks 123a, 123b, and 123c are modified to reduce values of loss functions characterizing differences between landmark features determined by the neural networks 123a, 123b, and 123c and the human-determined values.

The machine learning components corresponding to different facial states (e.g., machine learning component 136 corresponding to facial state 1 (106a) compared to another machine learning component corresponding to facial state 2 (106b)) can be different from one another as described above for the neural networks 123a, 123b, and 123c. For example, the machine learning components can be different from one another in one or more of layer number, number of nodes per layer, activation function (e.g., sigmoid vs. tanh), or parameters such as weights and/or hyperparameters. Accordingly, different machine learning components corresponding to different facial states can be trained to emphasize facial movements that are more relevant to the different facial states. For example, cheek movements may be more indicative of a given disease state during an "open mouth" sequence than during a "tongue out" sequence. Accordingly, based on training of the machine learning components that at least partially uses, as input data, facial movement data (e.g., landmark features) for "open mouth" sequences and for "tongue out" sequences and, as labels for the facial movement data, corresponding disease states, a machine learning component that receives movement data for the "open mouth" sequence can weight cheek movements more strongly than does a machine learning component that receives movement data for the "tongue out" sequence. In addition, like the other neural networks and machine learning components described in this disclosure, the machine learning component 136 can be disease-specific (e.g., trained based on training data in which labels indicate a disease state for a specific disease), such that the machine learning component can determine sequence scores that are most useful for subsequent determination of a patient score for the specific disease.

In some implementations, it can be desirable for the sequence score 134 to represent a combination of the landmark features 125a, 125b, and 125c such that the sequence score 134 is useful for subsequent disease state determination. Accordingly, in some implementations, the machine learning component 136 is trained together with machine learning component 142 (described in more detail below). For example, the training data can include scores characterizing a patient's movements (e.g., overall movements, corresponding to multiple landmark groups and/or multiple facial states, such as a patient score as described in reference to patient score 154) and/or scores characterizing a patient's disease state as described in reference to disease state determination 156. Accordingly, the machine learning component 136 can learn how the different landmark features 125a, 125b, 125c should be weighted relative to one another to obtain a sequence score 134 that is more indicative of overall patient movements and/or is more indicative of patient disease state when used in the machine learning component 142 that is trained jointly with the machine learning component 136. The machine learning component 136 can be trained jointly with machine learning components corresponding to other facial states as part of this combined training process. In some implementations, the training data includes distinct scores characterizing movements performed during respective facial states.

Alternatively, or in addition, in some implementations, the machine learning component 136 is trained separately from the machine learning component 142 and/or trained separately from other machine learning components corresponding to other facial states. The separately-trained machine learning components 136 can then, in some implementations, be kept constant while machine learning component 142 is trained to use the output sequence scores 134 of the separately-trained machine learning components 136 based on scores characterizing a patient's movements and/or disease state. In some implementations, the separately-trained machine learning components 136 can be altered (e.g., fine-tuned) during training of the machine learning component 142.

Besides training data related to video, audio, movement, and/or disease characteristics, in some implementations at least a portion of the neural network architecture can be trained based on other types of data, such as one or more of patient medical history, patient demographic information, patient diagnoses, patient medication history, patient dosing history, or patient biomarkers (e.g., activity monitoring data, physiological measures of heart rate, respiration, and/or metabolic rate), for patients whose video, audio, movement, and/or disease data are used to train at least a portion of the neural network architecture. Use of some or all of these types of data can improve neural network architecture performance by allowing analysis by the architecture to take into account variations based on patient populations, patient clinical presentation, and/or patient subtypes identified by clinical assessment or other biomarker measures. In some implementations, at least a portion of the neural network architecture can be trained to analyze a specific patient population, patients having a specific clinical presentation, and/or patients subtype.

Parameters of the training can vary depending on the implementation. In some implementations, a batch size of 64 sequences with 200-frame sequence length is used. A weight decay can be, for example, 1e-5. A gradient descent algorithm such as an Adam optimizer can be used for training.

In some implementations, in a training process, determined sequences corresponding to performed states are pre-processed to improve training effectiveness. In some implementations, starting and/or ending portions of sequences (e.g., 50 frame or 100 frame portions) are removed, which can decrease occurrence of transitional movements and incorrect state performance in the sequences. In some implementations, for a video sequence corresponding to a given facial (or other) state, a predetermined duration of the video sequence is used for training (e.g., even if the video sequence is longer than the predetermined duration), to avoid giving too much weight to longer videos compared to shorter ones. In some implementations, for each facial (or other) state for a patient, only a single video sequence is used for training, to avoid giving too much weight to some patients with more available video footage compared to other patients with less.

Figure 1C:
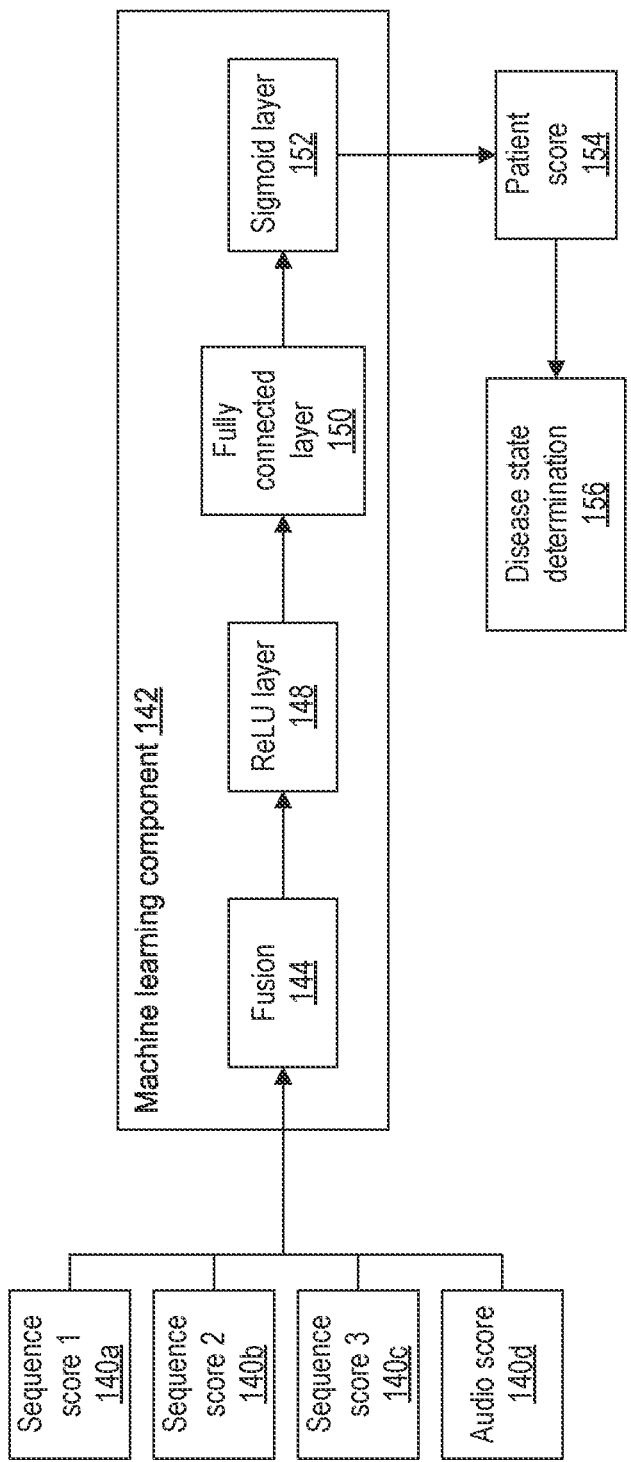

Sequence scores from multiple sequences are combined using another machine learning component (138). As shown in FIG. 1C, sequences scores 140a, 140b, and 140c, each corresponding to a different facial state performed by a patient, are provided into a machine learning component 142. In some implementations, an audio score 140d (described in more detail in reference to FIG. 1D) is also input into the machine learning component 142. The machine learning component 142 includes a fusion component 144 that combines (e.g., concatenates in a vector) the sequence scores 140*a*, 140*b*, and 140*c* and possible audio score 140*d*, an ReLU layer 148, one or more fully connected layers 150, and a sigmoid layer 152, e.g., as described for the machine learning component 136. The machine learning component 142 is trained to output a patient score 154 that characterizes the video 102 as a whole and which can be indicative of a medical state of the patient, such that in some implementations a disease state can be determined based on the patient score (156). For example, a patient score satisfying a threshold condition (e.g., below a threshold value) can be indicative of a presence of the disease in the patient. Alternatively, or in addition, a patient score can scale with disease severity, e.g., such that higher patient scores correspond to more pronounced disease states. Diseases that can be tested using these methods include, in various implementations, Parkinson's disease, akathisia, akinesia, athetosis, ataxia, ballismus, bradykinesia, cerebral palsy, chorea, dystonia, geniospasm, myoclonus, spasms, stereotypic movement disorder, stereotypy, tardive dyskinesia, post-traumatic stress disorder, and tic disorders, among others.

In some implementations, one or more other types of data describing the patient can be provided into the machine learning component 142, such as one or more of patient medical history, patient demographic information, patient diagnoses, patient medication history, patient dosing history, or patient biomarkers (e.g., activity monitoring data, physiological measures of heart rate, respiration, and/or metabolic rate). In some implementations, the machine learning component 142 is trained based on the one or more other types of data (as described above), so that the machine learning component 142 is configured to determine the patient score 154 based on the one or more other types of data. In some implementations, the one or more other types of data are instead or additionally employed elsewhere in the neural network architecture. For example, the patient score 154 can be determined based on movement-related sequence scores and an optional audio score, and the patient score 154 can then be processed with one or more other scores related to the one or more other types of data to obtain the disease state determination 156.

In some implementations, the machine learning component 142 is trained (e.g., to determine parameters of the layers of the machine learning component 142) based on training data that includes sequence scores corresponding to facial states in a video (where the sequence scores may be human-determined or determined by a neural network architecture such as that shown in FIG. 1B), the sequence scores labeled by a known disease state of the patient in the video. The layers of the machine learning component 142 are trained to determine the patient score 154 such that the patient score 154 is indicative of the disease state. Accordingly, in some implementations the machine learning component 142 is different (e.g., has different parameters of the layers and/or has a different overall architecture) for different diseases. For example, facial movement during performance of different facial states can be more/less indicative of disease state for different diseases; accordingly, for each disease, the machine learning component 142 can be trained to more heavily weight the sequence scores corresponding to the facial state that is more relevant to the disease.

Figure 1D:
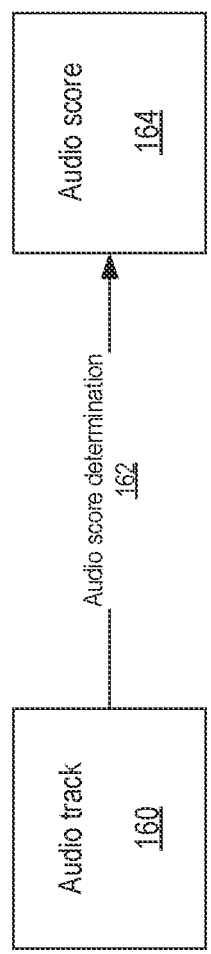

As noted above, in some implementations, audio is analyzed to determine an audio score based on which a patient score is determined. As shown in FIG. 1D, an audio track 160 can be extracted from the patient video 102 and proceed to determine an audio score 164 (162). For example, the audio score 164 can be calculated based on one or more verbal biomarkers in the audio track 160, such as a range of fundamental frequencies exhibited in phonation in the audio track 160, jitter during vowel sounds in the audio track 160, breathiness exhibited in the audio track 160, and/or a glottal-to-noise excitation ratio in the audio track 160. Examples of verbal biomarkers and their determination can be found in U.S. Patent Application Publication No. 2020/0251190, the entirety of which is hereby incorporated by reference. The audio score 164 can be provided as an input into machine learning component 142 as an additional factor based on which the patient score 154 can be determined.

Figure 2:
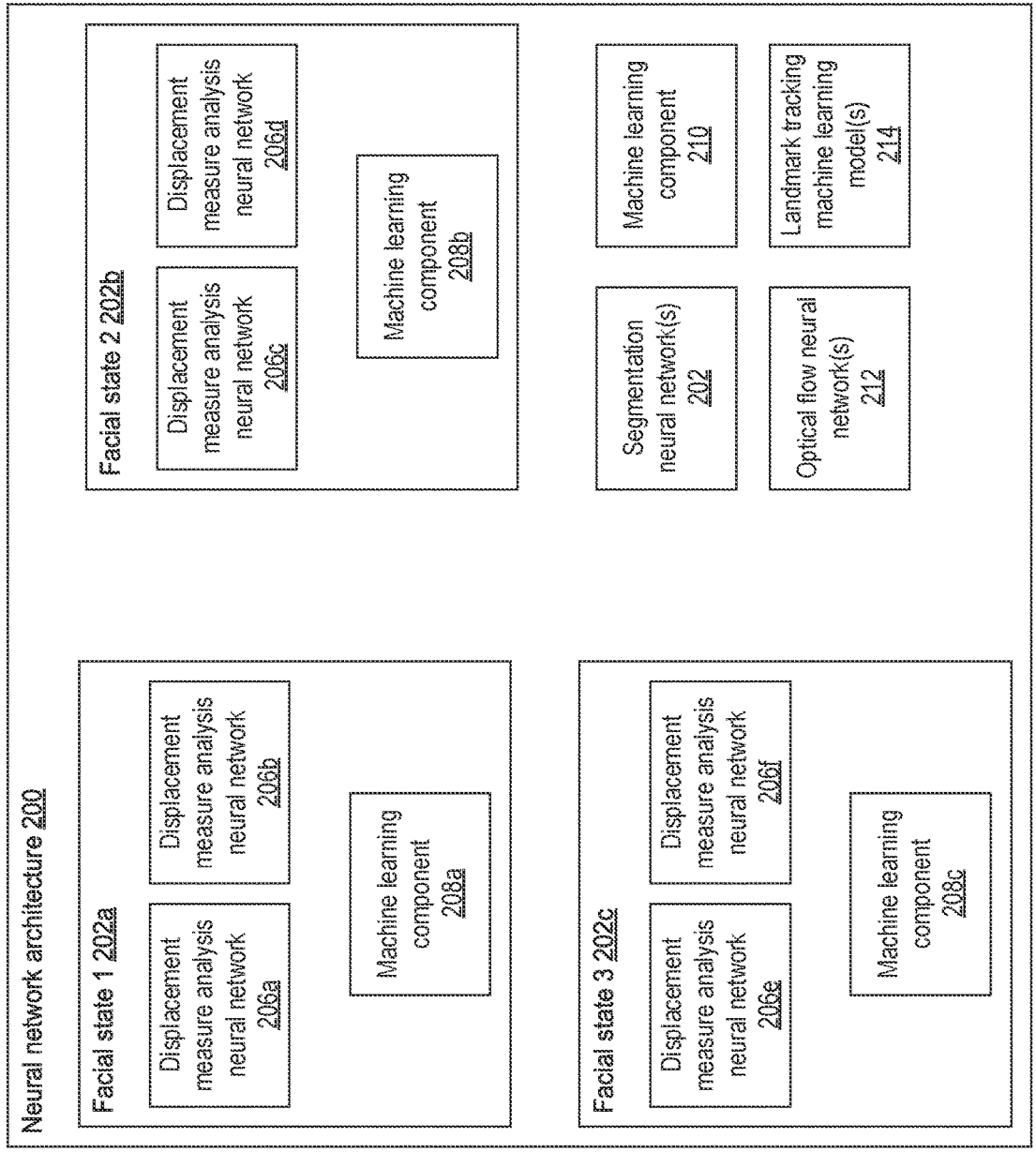
FIG. 2 is a diagram illustrating an example of a neural network architecture according to some implementations of this disclosure.

FIG. 2 shows an example of an overall neural network architecture 200 according to this disclosure. The neural network architecture 200 includes, for analysis each of multiple facial states 202*a*, 202*b*, and 202*c*, neural networks 206*a*-206*f* configured to analyze different groups of facial landmarks (e.g., as described for neural networks 123*a*, 123*b*, and 123*c*). In addition, for each facial state 202*a*, 202*b*, and 202*c*, the neural network architecture 200 includes a machine learning component 208*a*, 208*b*, 208*c* configured to analyze outputs of the corresponding neural networks 206*a*-206*f* to characterize video sequences, e.g., as described for machine learning component 136. The neural networks 206*a*-206*f* differ from one another within analysis of each different facial state 202*a*, 202*b*, 202*c* and can, in some implementations, differ from one another across different facial states 202*a*, 202*b*, 202*c*, even for analysis of the same landmark group.

One or more segmentation neural networks 202 are configured to segment patient video into sequences corresponding to different facial states, e.g., as described in reference to FIGS. 3-4. A machine learning component 210 is configured to receive outputs from the machine learning components 208*a*, 208*b*, and 208*c* and determine an overall patient score, e.g., as described for machine learning component 142. In some implementations, one or more optical flow neural networks 212 are configured to analyze video frames to determine optical flows based on which landmark displacement measures can be determined. In some implementations, one or more landmark tracking machine learning models 214 are configured to determine the landmark displacement measures.

Any or all of the neural networks, machine learning components, and machine learning models included in the neural network architecture 200 can be specific to one or more diseases, e.g., trained based on training data labeled with disease states of the one or more diseases. Accordingly, parameters of the neural networks, machine learning components, and machine learning models can be customized for more accurate determination of states of different diseases in different neural network architecture implementations.

Figure 6:
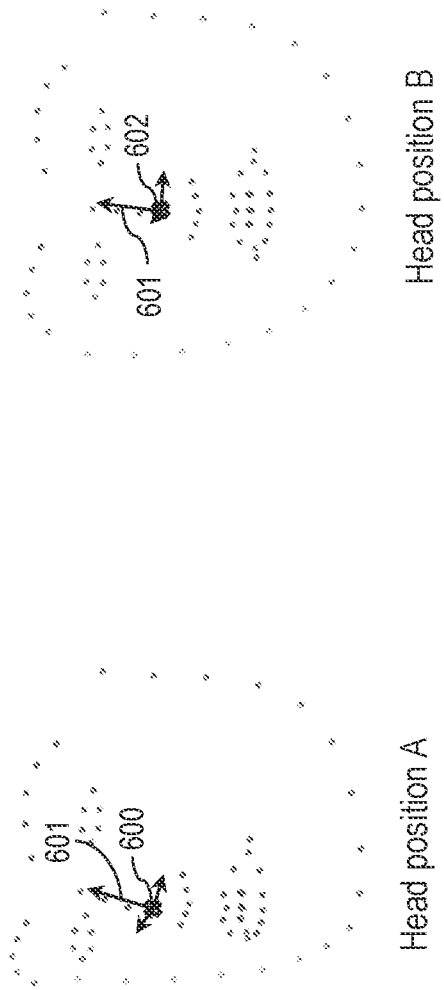
FIG. 6 is a diagram illustrating examples of local coordinate systems for two head configurations according to some implementations of this disclosure.
Figure 7:
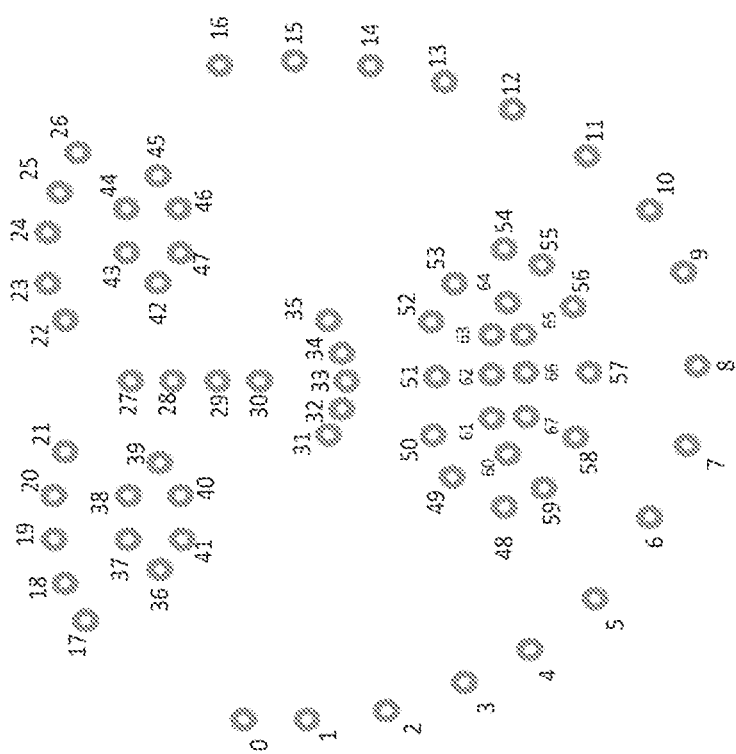
FIG. 7 is a diagram illustrating examples of facial landmarks according to some implementations of this disclosure.

In some implementations, for determination of displacement measures, landmark normalization is performed so that landmark locations can be determined in a local coordinate system that is invariant to rigid body and/or head movement. This can reduce or prevent determination of displacement measures based on rigid movements such as overall head tilts and body movements that move the head, isolating movements of facial muscles for analysis. As shown in FIG. 6, from a set of available and trackable landmarks, a subset of the landmarks—for example, landmarks 27-35 as shown in FIG. 7—are selected to construct a local coordinate system (LCS). The landmarks can be selected based on an extent to which the landmarks tend to exhibit non-rigid movement. For example, the nose (corresponding to landmarks 27-35) tends to exhibit few non-rigid movements, such that movement of nose landmarks indicates rigid movement of the entire head/face. Because these landmarks are indicative of rigid movement of the head/face, rigid movements of the head/face are reduced in an LCS based on these landmarks compared to a fixed coordinate system (e.g., coordinates of the video as-captured without transformation).

For each analyzed frame of a video sequence, positions of the subset of landmarks are determined, and an LCS is determined based on the landmarks. For example, an origin point and axes of the LCS can be determined. As shown for head position A in FIG. 6, an origin point 600 is determined, and x, y, and z axes of the head (such as axis 601) are determined. For head position B (e.g., portrayed in a different frame than head position A), a second origin point 602 and corresponding axes are determined. For each frame, other landmarks can be projected (transformed) into the LCS of the frame, and the projected coordinates of the landmarks are used for subsequent analysis, such as tracking of landmark groups and determination of displacement measures. For example, displacement measures determined based on transformed landmark coordinates (in an LCS frame) can be provided into as inputs to the neural networks 123*a*, 123*b*, and 123*c*.

In some implementations, the LCS is determined such that at least one of the selected landmarks is fixed in the LCS from frame to frame, e.g., one of the selected landmarks can serve as the origin point of the LCS. For example, the nose tip (e.g., landmark 33) exhibits only minimal non-rigid movement and accordingly serves as a useful fixed point for determination of the LCS. Another region or point having movement that is highly correlated with overall head movement can instead be used. In some implementations, for each frame, a transform can be determined from the fixed coordinate system of the frame to the LCS; the transform is determined as the transform that causes the at least one of the selected landmarks that will be fixed to be transformed to the landmark's fixed position in the LCS. The transform, once determined, can be applied to other landmarks in the frame to project the other landmarks into the LCS for determination of displacement metrics characterizing movement of the other landmarks in the LCS. In some implementations, transforms are represented and applied as matrices and using matrix operations, such as affine mappings (e.g., scaling, rotating, and/or shearing mappings) applied using matrix multiplication with coordinates of the landmarks.

Figure 8:
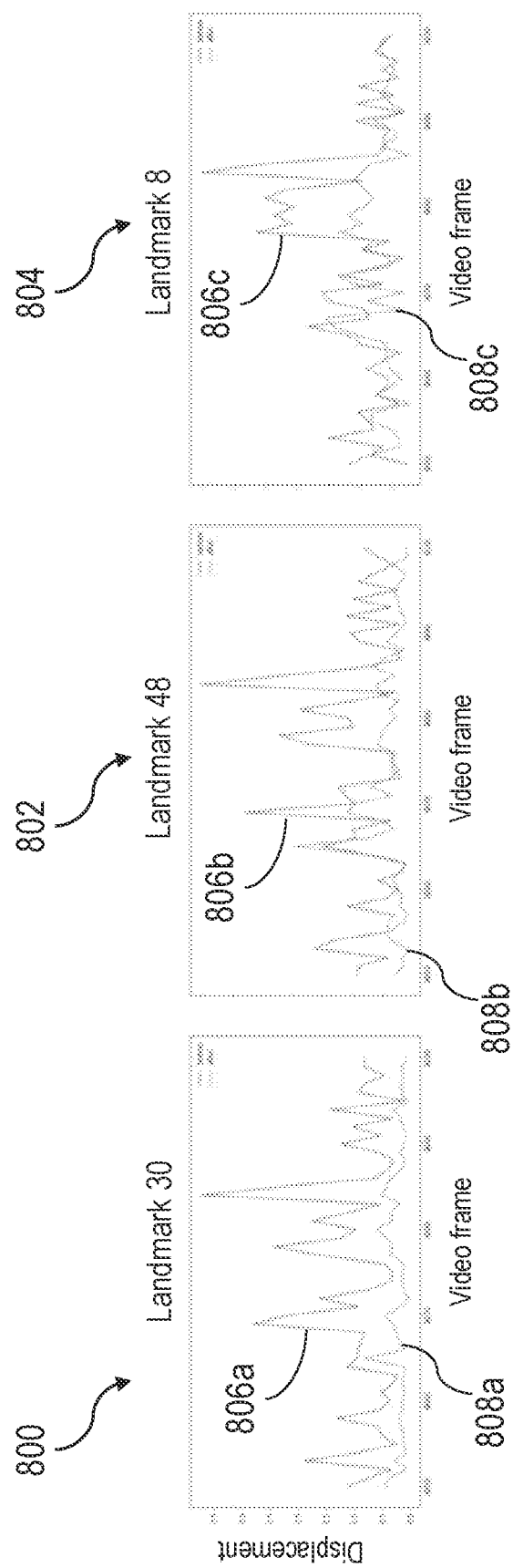
FIG. 8 includes three charts showing facial landmark displacement according to some implementations of this disclosure.

Landmark normalization can provide more stable displacement measures that are more indicative of facial movements that reflect disease states, such as facial muscle movements, than displacement measures based on nonnormalized landmarks. FIG. 8 shows frame-varying landmark displacement for three landmarks (30, 48 and 8 as shown in FIG. 7, corresponding to plots 800, 802, and 804, respectively) before and after normalization using nose landmarks. Spikes in the "before" curves 806*a*, 806*b*, 806*c* may correspond to rigid head movement such as overall head shaking and tilting, body repositioning, etc. The "after" curves 808*a*, 808*b*, 808*c* exhibit fewer spikes, corresponding to displacements that correspond more fully to facial musculature movement. Accordingly, in some implementations, the "after" curves are more useful for subsequent analysis, e.g., can be used to determine displacement measures and, correspondingly, patient scores that are more indicative of disease states.

In some implementations, tongue movements are included as a portion of the analysis. For example, tongue movements can be used to determine displacement measures for one or more facial states, such as a "tongue out" facial state. These displacement measures characterize tongue movement for input into a neural network for determination of a landmark feature. However, in some cases, tongue movement analysis can be more difficult than facial movement analysis. For example, landmarks may not be well-defined for tongues compared to faces.

Figure 9:
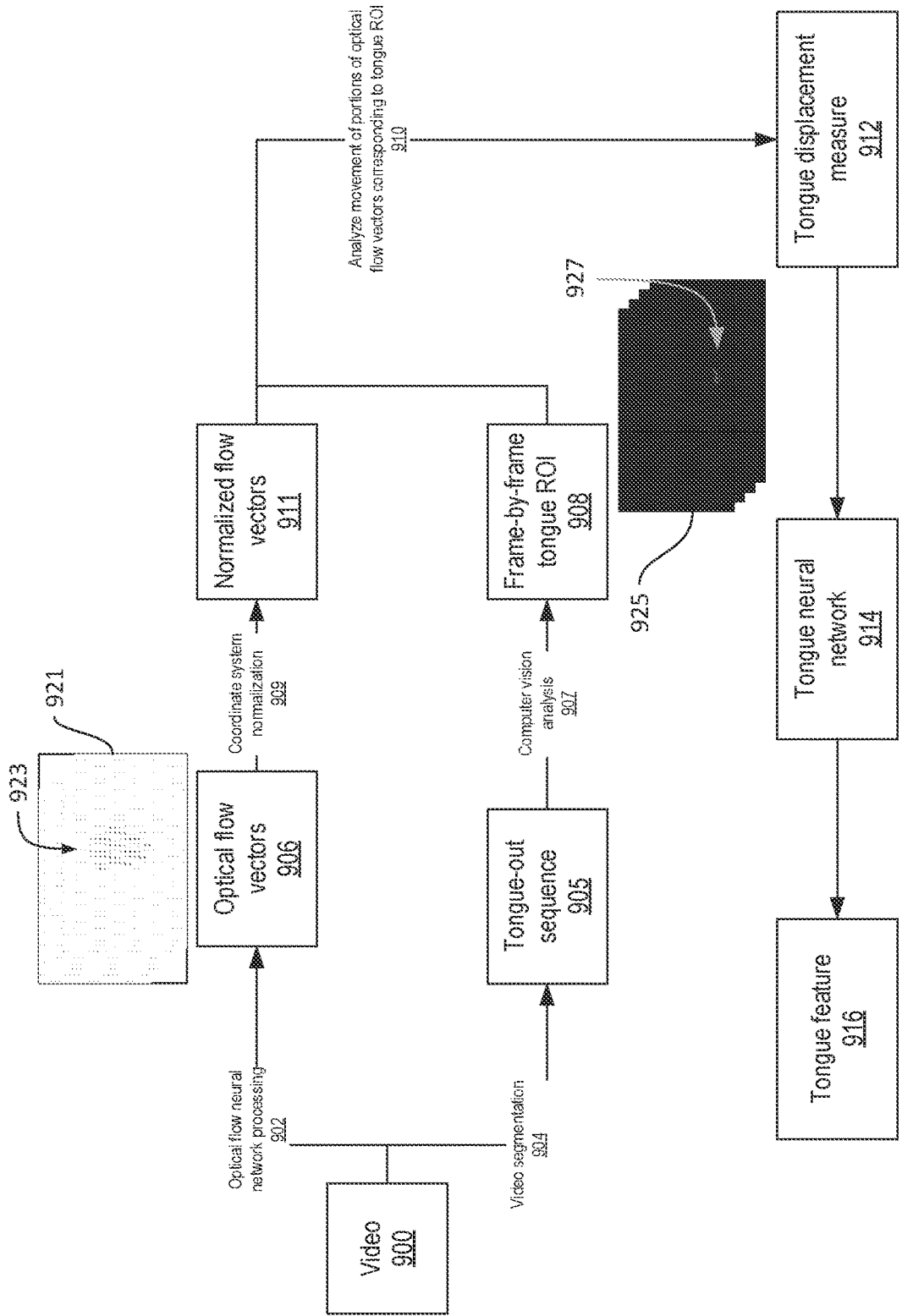
FIG. 9 is a diagram illustrating an example of a tongue movement analysis process according to some implementations of this disclosure.

Accordingly, in some implementations, a distinct tongue analysis method is applied to video sequences that show an exposed tongue. As shown in FIG. 9, a video 900 includes a portion showing an exposed tongue. The video 900 is provided as input to a neural network trained to determine optical flows (902). Examples of such neural networks can be found in U.S. Patent Application Publication No. 2020/0364868. The neural network provides, as output, optical flow vectors 906 characterizing movement of pixels and/or features in the video 900. For example, a visualized flow vector 921 includes a portion 923 showing comparatively higher movement magnitude, corresponding to a face of a patient. The optical flow vectors 906 are normalized as described in reference to FIGS. 6-8 to reduce contributions from rigid head and body movements (909), to obtain normalized flow vectors 911. For example, nose landmarks can be analyzed to determine a transform to an LCS, and the transform can be applied to the optical flow vectors 906 to obtain the normalized flow vectors 911. In some implementations, normalization is performed as part of determination of the optical flow vectors 906 or at another part of the process shown in FIG. 9.

In addition, video segmentation 904 is performed to identify one or more sequences of the video 900 in which the tongue of the patient is exposed. Video segmentation 904 can involve audio, video, or audio-visual analysis as described in reference to FIGS. 3-4. As a result of the segmentation, a tongue-out sequence 905 is obtained. A computer vision analysis 907 is performed on multiple frames of the tongue-out sequence 905 to identify, for each frame, a region of interest (ROI) that includes the tongue. Known computer vision techniques, such as one or more neural networks trained to identify tongues in images, can be used. As a result, frame-by-frame tongue ROIs 908 are obtained. For example, as shown in FIG. 9, for a first frame in a set of frames 925, an ROI 927 including the tongue is identified.

The determined ROIs 908 indicate portions of the normalized flow vectors 911 that should be analyzed. For example, in each normalized flow vector 911, a certain area corresponds to tongue movement, as opposed to cheek movement, jaw movement, etc. That area is identified using a tongue ROI 908 and analyzed to determine a tongue displacement measure 912, such as frame-wise or time-dependent displacement values of the tongue or portions thereof (e.g., pixels in the ROI identified as corresponding to the tongue). For example, an average displacement of pixels in the ROA can be calculated as the displacement measure 912, or another aggregate pixel measure can be used. By this and related methods, tongue ROI identification is combined with optical flow-based analysis so that tongue movements can be included in patient analysis, even in the absence of well-defined or easily-identifiable landmarks of the tongue.

As described for landmark displacement measures in reference to FIG. 1B, the tongue displacement measure 912 is input into a tongue neural network 914 that can be similar to the neural networks 123*a*, 123*b*, and 123*c*. For example, the tongue neural network 914 can be trained using training data that includes human-labeled videos of tongue motion. The tongue neural network 914 produces, as output, a tongue feature 916 that is provided (e.g., in conjunction with landmark features) into a machine learning component such as machine learning component 136, as described for the landmark features 125*a*, 125*b*, and 125*c*. As a result, determined patient scores can be determined based on tongue movement so as to be more indicative of disease state for diseases that are diagnosable based on tongue movement.

Figure 10:
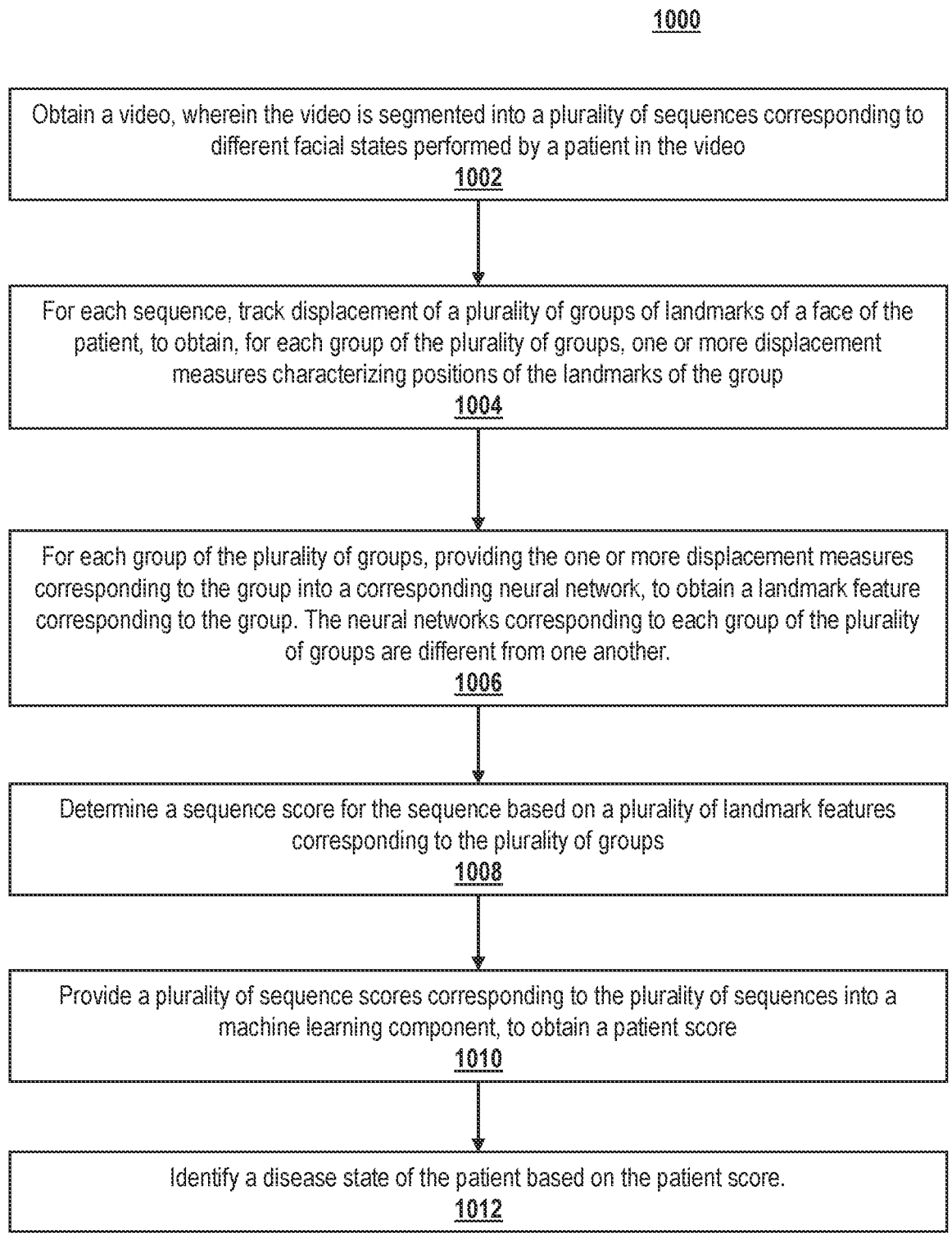
FIG. 10 is a diagram illustrating an example of a video analysis process according to some implementations of this disclosure.

FIG. 10 illustrates a method 1000 that can be performed according to some implementations described in this disclosure. In some implementations, method 1000 is implemented using a computing device, a computer-implemented system, or by processors acting on instructions stored in non-transitory, computer-readable media.

In the method 1000, a video is obtained (1002). The video is segmented into a plurality of sequences corresponding to different facial states performed by a patient in the video. For example, patient video 102 is obtained and segmented into sequences 106*a*-106*c* corresponding to different facial states.

For each sequence, displacement of each of a plurality of groups of landmarks of a face of the patient is tracked, to obtain, for each group of the plurality of groups, one or more displacement measures characterizing positions of the landmarks of the group (1004). For example, the landmark groups can be groups of points or positions on the face, e.g., corresponding to different portions of the face. For example, for facial state 1 (106*a*), displacement of three groups of landmarks is tracked, to obtain displacement measures 122*a*-122*c*.

For each sequence, for each group of the plurality of groups (e.g., groups corresponding to the sequence), the one or more displacement measures corresponding to the group are provided into a corresponding neural network, to obtain a landmark feature corresponding to the group (1006). The neural networks corresponding to each group of the plurality of groups are different from one another. For example, displacement measures 122*a*-122*c* are provided into neural networks 123*a*-123*c*, respectively, where neural networks 123*a*-123*c* are different from one another. For example, the neural networks can be different from one another in at least one of weights or hyperparameters.

For each sequence, a sequence score for the sequence is determined based on a plurality of landmark features corresponding to the plurality of groups (1008). For example, for the sequence 106*a* corresponding to a particular facial state, landmark features 125*a*-125*c*, which are associated with displacement of different respective groups of landmarks during performance of the facial state, are provided into a machine learning component 136, which processes the landmark features 125*a*-125*c* in one or more layers/components to obtain sequence score 134.

A plurality of sequences scores corresponding to the plurality of sequences are provided into a machine learning component, to obtain a patient score (1010). For example, the sequences corresponding to facial states 1-3 (106*a*-106*c*) are each processed to obtain corresponding sequence scores 140*a*-140*c*. Sequence scores 140*a*-140*c* are provided into machine learning component 142, which processes the sequence scores 140*a*-140*c* to obtain patient score 154.

A disease state of the patient is identified based on the patient score (1012). For example, the patient score can be compared to a threshold value. If the patient score is above the threshold value, it is determined that the patient has a disease. In some cases, the patient score indicates a severity of a disease, e.g., where a higher score indicates higher disease severity.

The method 1000 is an example of use of a machine learning architecture to analyze video of a patient to reach a determination about a disease state of the patient. Various examples of such analysis can be implemented in various ways using a machine learning architecture that has some or all of the features described in reference to FIGS. 1A-1D and FIG. 2. In some implementations, the machine learning architecture includes different modules (e.g., modules 202*a*-202*c*) configured to analyze different facial states. In some implementations, the machine learning architecture includes different displacement measure analysis neural networks (e.g., neural networks 206*a*-206*f*) configured to analyze different groups of facial landmarks. In some implementations, the machine learning architecture includes different machine learning components (e.g., machine learning components 208*a*-208*c*) configured to determine sequence scores corresponding to different sequences/facial states. In some implementations, the machine learning architecture includes a machine learning component configured to determine a patient score based on sequence scores corresponding to multiple sequences/facial states (e.g., machine learning component 210). Accordingly, an example of a method according to this disclosure is "analyze, using a machine learning architecture having some or all of the features described in reference to FIGS. 1A-1D and FIG. 2, video of a patient to obtain a determination about a disease state of the patient," where various combinations of the described features can be included in various different implementations.

Figure 11:
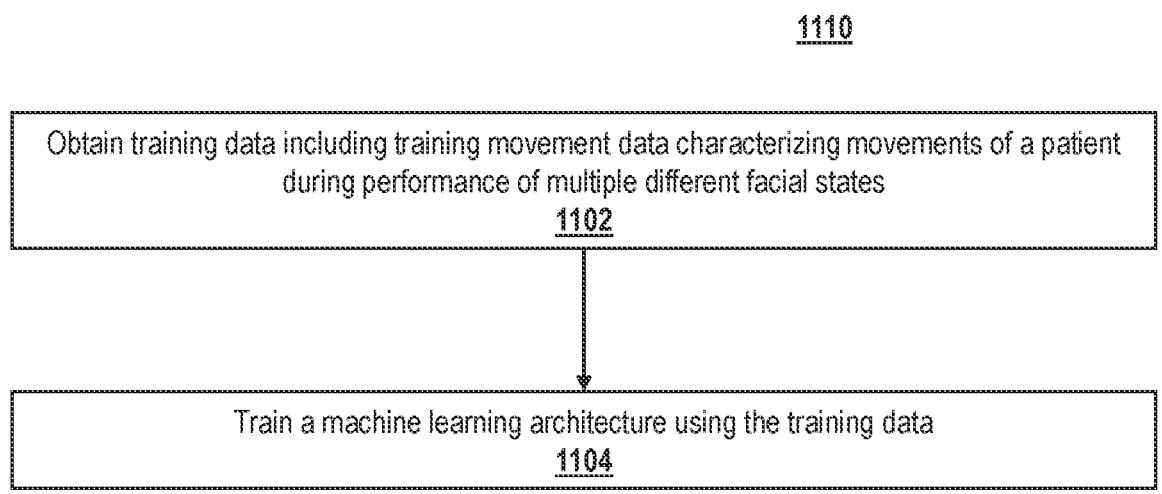
FIG. 11 is a diagram illustrating an example of a machine learning architecture training process according to some implementations of this disclosure.

FIG. 11 illustrates a method 1100 that can be performed according to some implementations described in this disclosure. In some implementations, method 1100 is implemented using a computing device, a computer-implemented system, or by processors acting on instructions stored in non-transitory, computer-readable media.

In the method 1100, training data is obtained, the training data including training movement data characterizing movements of a patient during performance of multiple different facial states (1102). A machine learning architecture is trained using the training data (1104). The machine learning architecture can have some or all of the features described in reference to FIGS. 1A-1D and FIG. 2, and training of the machine learning architecture can be conducted as described in reference to FIGS. 1A-1D and FIG. 2.

Figure 12:
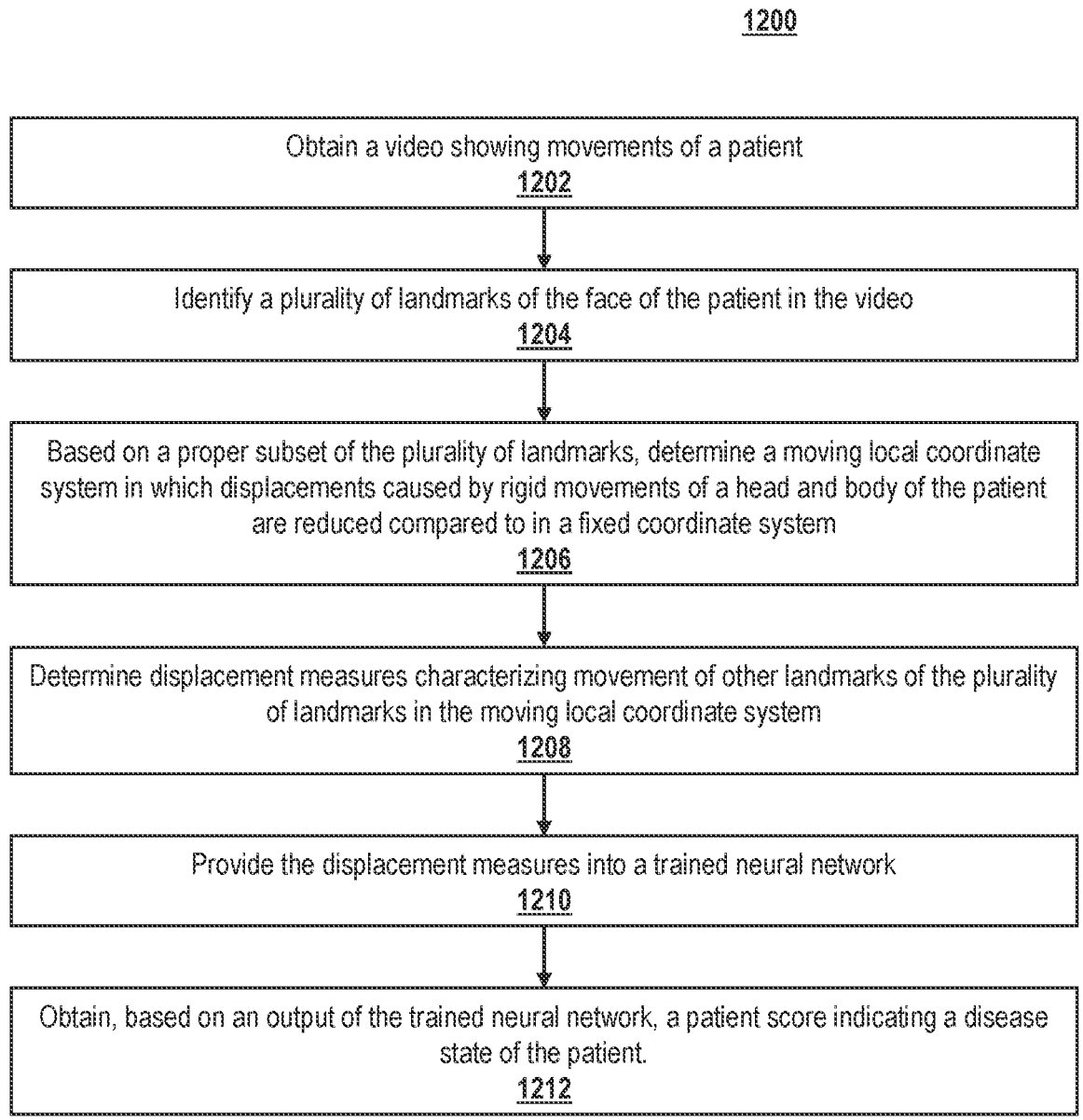
FIG. 12 is a diagram illustrating an example of a video analysis process according to some implementations of this disclosure.

FIG. 12 illustrates a method 1200 that can be performed according to some implementations described in this disclosure. In some implementations, method 1200 is implemented using a computing device, a computer-implemented system, or by processors acting on instructions stored in non-transitory, computer-readable media.

In the method 1200, a video is obtained showing movements of a patient (1202). A plurality of landmarks of the face of the patient are identified in the video (1204). For example, at least some of the landmarks shown in FIG. 7 can be identified. Based on a proper subset of the plurality of landmarks, a moving local coordinate system is determined (1206). For example, the proper subset can be or include a landmark that exhibits relatively little non-rigid movement, such as a nose tip. Displacements caused by rigid movements of a head and body of the patient are reduced in the moving local coordinate system compared to in a fixed coordinate system, e.g., as described in reference to FIG. 6. Displacement measures characterizing movement of other landmarks of the plurality of landmarks are determined in the moving local coordinate system (1208). For example, a transform can be determined that causes one or more of the landmarks of the proper subset of landmarks to be fixed in the moving local coordinate system, and that transform can be applied to the other landmarks. The displacement measures can be determined by analysis of the movement, e.g., the displacement measures can be displacement measures 122a-122c. The displacement measures are provided into a trained neural network (1210). For example, the displacement measures can be provided into one or more neural networks, such as neural networks 123a-123b. Based on an output of the trained neural network, a patient score indicating a disease state of the patient is obtained (1212). For example, the neural network can output a landmark feature that is processed as described in reference to FIGS. 1A-1D and 2, to obtain patient score 154.

The features described in this disclosure may be implemented in digital electronic circuitry or in computer hardware, firmware, software, or in combinations of them. The features may be implemented in a computer program product tangibly embodied in a non-transitory information carrier, e.g., in a machine-readable storage device, for execution by a programmable processor. Method steps may be performed by a programmable processor executing a program of instructions to perform functions of the described implementations by operating on input data and generating output. Processors and other computer components associated with performance of described processes can be included in user devices (e.g., smartphones, personal computers, and tablets) and/or in systems remote to users, such as cloud computing systems and remote servers.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

A number of implementations have been described. Nevertheless, it will be understood that various modifications may be made. Elements of one or more implementations may be combined, deleted, modified, or supplemented to form further implementations. For example, although neural network architectures have been described in which distinct neural networks perform different processes, in some implementations, these neural networks may be sub-networks of an overall neural network. As another example, the described architectures (such as the combination and sequence of layers described for machine learning components) and specific neural network types are non-limiting examples that can be different in various implementations. As another example, it is recognized that neural networks represent a particular class of implementations of machine learning models generally, and (i) machine learning implementations described in this disclosure as "neural networks" can include components/portions that employ other machine learning methods/approaches in addition to neural networks, and (ii) that, in some implementations, machine learning implementations described as "neural networks," such as neural networks used to analyze movement of landmarks, can instead employ other machine learning methods/approaches. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
   obtaining a video, wherein the video is segmented into a plurality of sequences corresponding to different facial states performed by a patient in the video;
   for each sequence,
      tracking displacement of a plurality of groups of landmarks of a face of the patient, to obtain, for each group of the plurality of groups, one or more displacement measures characterizing positions of the landmarks of the group,
      allocating the one or more displacement measures obtained for each group of the plurality of groups between a plurality of neural networks, wherein the allocating comprises, for each group of the plurality of groups,
         providing the one or more displacement measures corresponding to the group into a corresponding neural network of the plurality of neural networks, to obtain a landmark feature corresponding to the group, wherein the neural network corresponding to each group of the plurality of groups is different from neural networks, of the plurality of neural networks, corresponding to other groups of the plurality of groups, and
      determining a sequence score for the sequence based on a plurality of landmark features corresponding to the plurality of groups;

providing a plurality of sequence scores corresponding to the plurality of sequences into a machine learning component, to obtain a patient score; and identifying a disease state of the patient based on the patient score.

2. The method of claim 1, wherein the plurality of groups of landmarks correspond to different portions of the face of the patient.

3. The method of claim 1, wherein the different facial states comprise one or more of a mouth state, a tongue state, or a jaw state.

4. The method of claim 1, wherein the plurality of neural network are different from one another in at least one of weights or hyperparameters.

5. The method of claim 1, comprising segmenting the video into the plurality of sequences, wherein segmenting the video comprises:

obtaining an audio track corresponding to the video;
determining a text transcript of the audio track;
using a natural language processing neural network, identifying portions of the text transcript that correspond to the different facial states performed by the patient; and
based on a correspondence between the identified portions of the text transcript and portions of the video, segmenting the video into the plurality of sequences such that each sequence of the plurality of sequences portrays a corresponding facial state indicated by the text transcript.

6. The method of claim 1, wherein the plurality of neural networks comprise bidirectional gated recurrent neural networks.

7. The method of claim 1, wherein a first plurality of groups of landmarks tracked in a first sequence of the plurality of sequences is at least partially different from a second plurality of groups of landmarks tracked in a second sequence of the plurality of sequences.

8. The method of claim 1, wherein, for each sequence, determining the sequence score for the sequence comprises:

combining the plurality of landmark features corresponding to the plurality of groups using an additional machine learning component, to obtain the sequence score for the sequence.

9. The method of claim 8, wherein the additional machine learning component comprises a long short-term memory neural network.

10. The method of claim 1, wherein providing the plurality of sequence scores into the machine learning component comprises:

providing the plurality of sequence scores into an activation function, to obtain an activation function output; and
determining the patient score based on the activation function output.

11. The computer-implemented method of claim 1, wherein providing the plurality of sequence scores corresponding to the plurality of sequences into the machine learning component to obtain the patient score comprises:

determining, as a first sequence, a sequence of the video in which a tongue of the patient is displayed;
determining optical flows characterizing facial movement in the first sequence;
applying a trained tongue identification neural network to determine, for a plurality of frames of the video, a tongue region of interest;
determining a tongue displacement measure based on portions of the optical flows corresponding to the tongue region of interest; and determining the patient score based on the tongue displacement measure.

12. The computer-implemented method of claim 1, wherein providing the plurality of sequence scores corresponding to the plurality of sequences into the machine learning component to obtain the patient score comprises:

obtaining an audio track from the video;
determined, based on one or more verbal biomarkers in the audio track, an audio score; and
providing the audio score into the machine learning component to obtain the patient score based on the plurality of sequence scores and based on the audio score.

13. A computer-implemented system, comprising:

one or more computers; and
one or more non-transitory computer-readable storage media interoperably coupled with the one or more computers and storing instructions that, when executed by the one or more computers, cause the one or more computers to perform operations comprising:
obtaining a video, wherein the video is segmented into a plurality of sequences corresponding to different facial states performed by a patient in the video;
for each sequence,
tracking displacement of a plurality of groups of landmarks of a face of the patient, to obtain, for each group of the plurality of groups, one or more displacement measures characterizing positions of the landmarks of the group,
allocating the one or more displacement measures obtained for each group of the plurality of groups between a plurality of neural networks, wherein the allocating comprises, for each group of the plurality of groups,
providing the one or more displacement measures corresponding to the group into a corresponding neural network of the plurality of neural networks, to obtain a landmark feature corresponding to the group, wherein the neural network corresponding to each group of the plurality of groups is different from neural networks, of the plurality of neural networks, corresponding to other groups of the plurality of groups, and
determining a sequence score for the sequence based on a plurality of landmark features corresponding to the plurality of groups;
providing a plurality of sequence scores corresponding to the plurality of sequences into a machine learning component, to obtain a patient score; and
identifying a disease state of the patient based on the patient score.

14. The computer-implemented system of claim 13, wherein the plurality of groups of landmarks correspond to different portions of the face of the patient.

15. The computer-implemented system of claim 13, wherein the plurality of neural networks are different from one another in at least one of weights or hyperparameters.

16. The computer-implemented system of claim 13, wherein the operations comprise segmenting the video into the plurality of sequences, wherein segmenting the video comprises:

obtaining an audio track corresponding to the video;
determining a text transcript of the audio track;
using a natural language processing neural network, identifying portions of the text transcript that correspond to the different facial states performed by the patient; and based on a correspondence between the identified portions of the text transcript and portions of the video, segmenting the video into the plurality of sequences such that each sequence of the plurality of sequences portrays a corresponding facial state indicated by the text transcript.

17. The computer-implemented system of claim 13, wherein a first plurality of groups of landmarks tracked in a first sequence of the plurality of sequences is at least partially different from a second plurality of groups of landmarks tracked in a second sequence of the plurality of sequences.

18. The computer-implemented system of claim 13, wherein, for each sequence, determining the sequence score for the sequence comprises:
  combining the plurality of landmark features using an additional machine learning component, to obtain the sequence score for the sequence.

19. The computer-implemented system of claim 13, wherein providing the plurality of sequence scores corresponding to the plurality of sequences into the machine learning component to obtain the patient score comprises:
  determining, as a first sequence, a sequence of the video in which a tongue of the patient is displayed;
  determining optical flows characterizing facial movement in the first sequence;
  applying a trained tongue identification neural network to determine, for a plurality of frames of the video, a tongue region of interest;
  determining a tongue displacement measure based on portions of the optical flows corresponding to the tongue region of interest; and
  determining the patient score based on the tongue displacement measure.

20. One or more non-transitory, computer-readable media storing instructions that, when executed by at least one processor, cause the at least one processor to perform operations comprising:
  obtaining a video, wherein the video is segmented into a plurality of sequences corresponding to different facial states performed by a patient in the video;
  for each sequence,
    tracking displacement of a plurality of groups of landmarks of a face of the patient, to obtain, for each group of the plurality of groups, one or more displacement measures characterizing positions of the landmarks of the group,
    allocating the one or more displacement measures obtained for each group of the plurality of groups between a plurality of neural networks, wherein the allocating comprises, for each group of the plurality of groups,
      providing the one or more displacement measures corresponding to the group into a corresponding neural network of the plurality of neural networks, to obtain a landmark feature corresponding to the group, wherein the neural network corresponding to each group of the plurality of groups is different from neural networks, of the plurality of neural networks, corresponding to other groups of the plurality of groups, and
    determining a sequence score for the sequence based on a plurality of landmark features corresponding to the plurality of groups;
  providing a plurality of sequence scores corresponding to the plurality of sequences into a machine learning component, to obtain a patient score; and
  identifying a disease state of the patient based on the patient score.

21. The method of claim 1, wherein the plurality of neural networks are trained based on landmark data from different respective portions of a human face.

* * * * *